United States Patent
Satish et al.

(10) Patent No.: US 7,506,056 B2
(45) Date of Patent: Mar. 17, 2009

(54) SYSTEM ANALYZING CONFIGURATION FINGERPRINTS OF NETWORK NODES FOR GRANTING NETWORK ACCESS AND DETECTING SECURITY THREAT

(75) Inventors: Sourabh Satish, Fremont, CA (US); Brian Hernacki, San Carlos, CA (US)

(73) Assignee: Symantec Corporation, Cupertino, CA (US)

( * ) Notice: Subject to any disclaimer, the term of this patent is extended or adjusted under 35 U.S.C. 154(b) by 426 days.

(21) Appl. No.: 11/478,932

(22) Filed: Jun. 30, 2006

(65) Prior Publication Data

US 2007/0233862 A1    Oct. 4, 2007

Related U.S. Application Data

(63) Continuation-in-part of application No. 11/392,093, filed on Mar. 28, 2006.

(51) Int. Cl.
*G06F 15/173* (2006.01)
(52) U.S. Cl. .................. 709/225; 709/223; 709/224
(58) Field of Classification Search .......... 709/223, 709/224, 225, 226, 227, 249, 250, 251, 252, 709/253; 707/204; 726/5; 358/1.14
See application file for complete search history.

(56) References Cited

U.S. PATENT DOCUMENTS

| | | | |
|---|---|---|---|
| 2005/0259289 A1* | 11/2005 | Ferlitsch et al. | 358/1.14 |
| 2006/0200856 A1* | 9/2006 | Salowey et al. | 726/5 |
| 2006/0248187 A1* | 11/2006 | Thorpe et al. | 709/224 |
| 2007/0198609 A1* | 8/2007 | Black et al. | 707/204 |

* cited by examiner

*Primary Examiner*—Le Luu
(74) *Attorney, Agent, or Firm*—Meyertons Hood Kivlin Kowert & Goetzel, P.C.; B. Noël Kivlin

(57) ABSTRACT

Various embodiments of a method for detecting a trend in a computer network comprising a plurality of nodes are described. According to one embodiment of the method, network admission control is performed for each node in the network. One or more configuration fingerprints may be created for each node in response to the network admission control for the node, e.g., where the configuration fingerprints for a given node identify selected aspects of the configuration of the node. The method further comprises detecting a trend based on at least a subset of the configuration fingerprints for the nodes. For example, the configuration fingerprints may be analyzed in order to detect trends that indicate security threats.

14 Claims, 8 Drawing Sheets

SYSTEM ANALYZING CONFIGURATION FINGERPRINTS OF NETWORK NODES FOR GRANTING NETWORK ACCESS AND DETECTING SECURITY THREAT

This application is a continuation-in-part of U.S. patent application Ser. No. 11/392,093, filed Mar. 28, 2006.

BACKGROUND OF THE INVENTION

1. Field of the Invention

This invention relates to computer networks. More particularly, the invention relates to a system and method for detecting a trend in a computer network.

2. Description of the Related Art

In computer networks, a plurality of nodes (e.g., computer systems or other devices) are coupled to a network in order to communicate with each other or share resources. Computer networks face a wide variety of security issues. One aspect of network security pertains to network admission control. For example, some networks require a node's configuration to be validated before the node is admitted to join the network. Any of various aspects of the node's configuration may be checked to determine whether the node meets configuration requirements for joining the network. For example, network admission control may be based on factors such as whether the node is up to date with patches and security definitions.

Another aspect of network security pertains to infection by malicious software, sometimes referred to as "malware". When malware infests a network or when an attacker begins to compromise a series of nodes within a network, it is desirable to detect the problem in order to be able to respond. While some forms of malware or attack can be relatively easily detected by analyzing network traffic, other forms cannot be easily identified in this manner. Thus, detection approaches based on network traffic analysis perform poorly against some forms of malware or attack. Other detection approaches involve actively scanning the network nodes for potential security threats. For example, the nodes may execute specialized security software for this purpose. However, this approach to malware detection can interfere with the node's normal operation and reduce its efficiency.

SUMMARY

Various embodiments of a method for detecting a trend in a computer network comprising a plurality of nodes are described. According to one embodiment of the method, network admission control is performed for each node in the network. For each node, performing the network admission control for the node comprises creating one or more configuration fingerprints for the node. A configuration fingerprint for a given node identifies selected aspects of the configuration of the node. The method further comprises detecting a trend based on at least a subset of the configuration fingerprints for the nodes.

BRIEF DESCRIPTION OF THE DRAWINGS

A better understanding of the invention can be obtained when the following detailed description is considered in conjunction with the following drawings, in which.

Figure 1A:
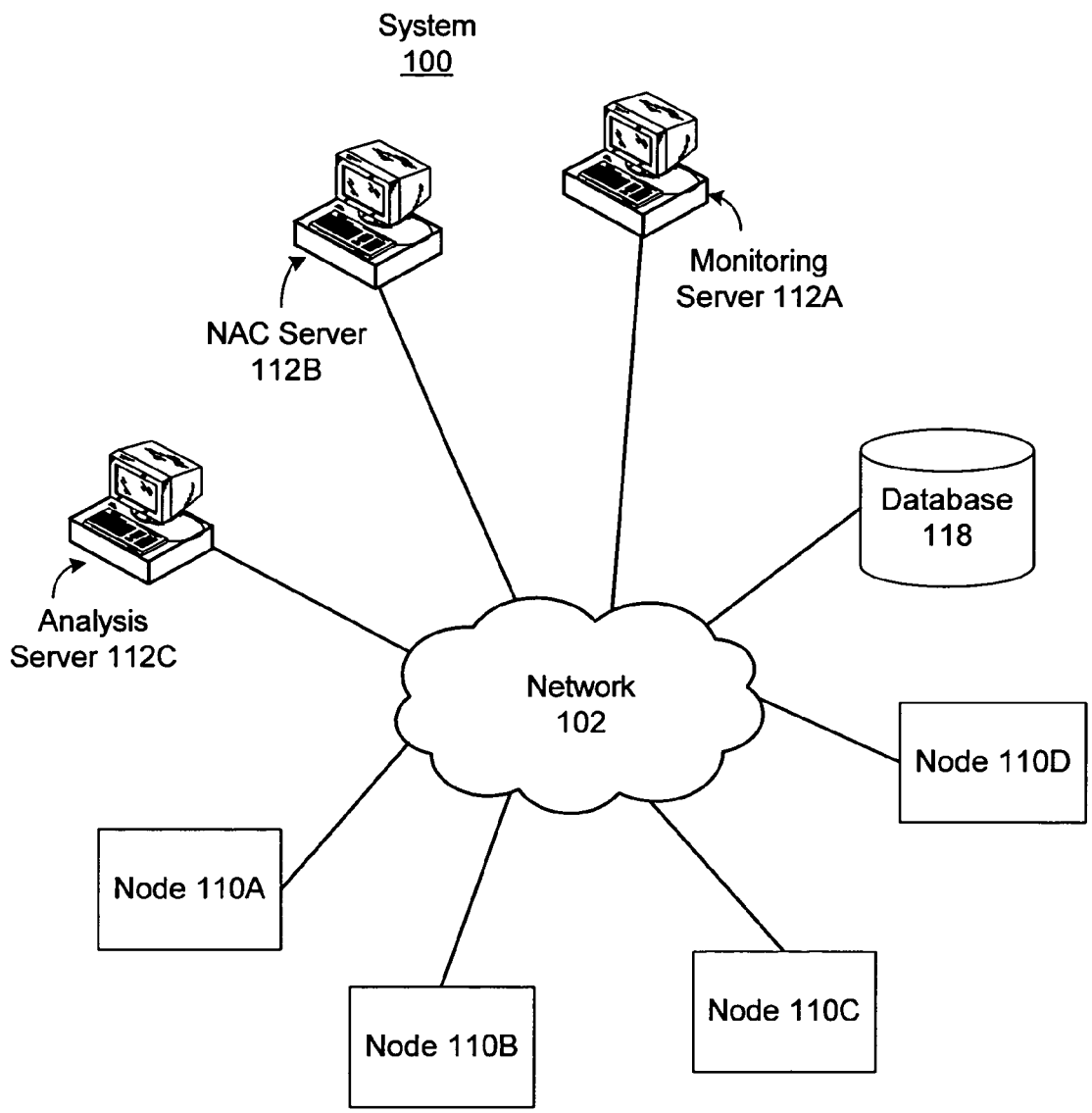
FIGS. 1A and 1B illustrate exemplary embodiments of a system that includes a plurality of nodes coupled through a network, where the system is operable to perform network admission control and trending analysis based on configuration fingerprints for the nodes.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a method for detecting trends among nodes (e.g., computer systems) coupled to a network are described herein. Each time a node joins the network, a configuration fingerprint for the node may be created, where the configuration fingerprint identifies selected aspects of the configuration of the node. The configuration fingerprint may be used for network admission control, e.g., to verify that the node meets configuration requirements necessary for admission to the network. In some embodiments, subsequent configuration fingerprints may also be created after the node has been admitted to the network, where the subsequent configuration fingerprints are also used for network admission control, e.g., to verify that the node's configuration remains satisfactory for continued admission to the network.

The configuration fingerprints for the various nodes may be stored, e.g., in a database. The method may operate to analyze the configuration fingerprints to determine whether various types of trends exist. In one embodiment, the method may operate to detect a trend across the nodes, i.e., a trend pertaining to a plurality of the nodes. For example, the method may analyze one or more configuration fingerprints for each of the nodes to determine whether a trend across the nodes exists. In another embodiment, the method may operate to detect a trend for a single node, e.g., a trend pertaining only to the single node. For example, the method may analyze a plurality of configuration fingerprints for the single node to determine whether a trend for the single node exists, e.g., where the configuration fingerprints for the single node are created at different times.

In various embodiments the method may be operable to analyze the configuration fingerprints for the nodes in order to detect any kind of trend. In particular, the configuration fingerprints may be analyzed in order to detect trends that indicate security threats. Exemplary types of analyses to detect trends indicating security threats or other types of trends are discussed below.

Thus, the configuration fingerprints that are created during the network admission control for the nodes may be utilized for trending analysis in addition to the network admission control. By re-using the configuration fingerprints to identify trends among the nodes, the need to obtain information especially for this purpose may be avoided, leading to greater efficiency of the system.

Referring now to FIG. 1A, an exemplary embodiment of a system 100 that includes a plurality of nodes 110 coupled through a network 102 is illustrated. Each node 110 may comprise any kind of device operable to send and receive data over the network 102, such as a computing device, personal computer system (PC), workstation, network appliance, personal digital assistant (PDA), television system, or other device or combination of devices. In this example, the system 100 includes nodes 110A-110D, although in various embodiments any number of nodes 110 may be present. It is noted that throughout this disclosure, drawing features identified by the same reference number followed by a letter (e.g., nodes 110A-110D) may be collectively referred to by that reference number alone (e.g., nodes 110) where appropriate.

In various embodiments, the network 102 may include any type of network or combination of networks. For example, the network 102 may include any type or combination of local area network (LAN), a wide area network (WAN), an Intranet, the Internet, etc. Exemplary local area networks include Ethernet networks, Fiber Distributed Data Interface (FDDI) networks, and token ring networks. Also, each node 110 may be coupled to the network 102 using any type of wired or wireless connection medium. For example, wired mediums may include Ethernet, fiber channel, a modem connected to plain old telephone service (POTS), etc. Wireless connection mediums may include a wireless link such as Wi-Fi™, a wireless connection using a wireless communication protocol such as IEEE 802.11 (wireless Ethernet), a modem link through a cellular service, a satellite link, etc.

The system 100 may also include one or more server computer systems 112 operable to perform various functions related to management of the nodes 110. In particular, the servers 112 may perform operations related to network admission control and trending analysis for the nodes 110, as described above. For example, FIG. 1A illustrates an embodiment in which the system 100 includes a monitoring server 112A, a network admission control (NAC) server 112B, and an analysis server 112C.

The monitoring server 112A may detect when a node 110 attempts to join the system 100 and may create an initial configuration fingerprint for the node 110 in response, e.g., where the initial configuration fingerprint represents selected aspects of the configuration of the node 110. The NAC server 112B may receive the initial configuration fingerprint for the node 110 and verify that the node 110 meets configuration requirements necessary for admission to the system 100, based on the initial configuration fingerprint.

In some embodiments, the monitoring server 112A may also create subsequent configuration fingerprints for nodes 110 after they have been admitted to the system 100. For example, as described below, the monitoring server 112A may monitor network traffic of the nodes 110 and/or may poll the nodes 110 to determine selected aspects of their configurations and may create subsequent configuration fingerprints for the nodes 110 representing the determined configuration information.

The NAC server 112B may receive the subsequent configuration fingerprints for the nodes 110 and verify that the configurations of the nodes 110 remain satisfactory for continued admission to the system 100. For example, it is possible that significant changes may be made to a node 110 after it has been admitted to the system 100, where the changes could affect its admission status. Thus, nodes 110 may be monitored over time to ensure that they meet requirements for continued admission to the system 100.

The various configuration fingerprints for the nodes 110 may be stored, e.g., in a database 118 such as shown in FIG. 1A. In various embodiments the database 118 may comprise information stored or formatted in any manner, such as a relational database, object-oriented database, or simply one or more files, e.g., where the files include text and/or binary information. Also, the configuration fingerprints for the nodes 110 may be stored in the database 118 in either volatile memory (e.g., data structures stored in RAM) or non-volatile memory (e.g., data stored on a hard disk or optical storage).

In FIG. 1A, the database 118 is illustrated as being coupled to the network 102. For example, the database 118 may be located on a dedicated database server computer or storage device, and the servers 112 may communicate with the database server computer or storage device via the network 102. In other embodiments the database 118 may be coupled to the servers 112 in any of various other ways. For example, the database 118 may be located on one of the servers 112. Also, in some embodiments the database 118 may be distributed across multiple servers 112 or may be distributed across other computers or storage devices in the system 100.

The analysis server 112C may receive the configuration fingerprints for the nodes 110. For example, in an embodiment in which the configuration fingerprints are stored in the database 118, the analysis server 112C may receive the configuration fingerprints from the database 118. The analysis server 112C may analyze or inspect the configuration fingerprints in order to determine whether various types of trends exist. As noted above, the configuration fingerprints may be analyzed to detect a trend across nodes, e.g., a trend pertaining to a plurality of the nodes 110, and/or to detect a trend pertaining only to a single node 110. In various embodiments, all of the configuration fingerprints or any subset of the configuration fingerprints may be received and analyzed by the analysis server 112C, where the configuration fingerprints may be analyzed using any technique (e.g., any algorithm, heuristic, or analysis method) in order to detect any kind of trend. Exemplary types of trending analysis based on the configuration fingerprints are discussed below.

Figure 1B:
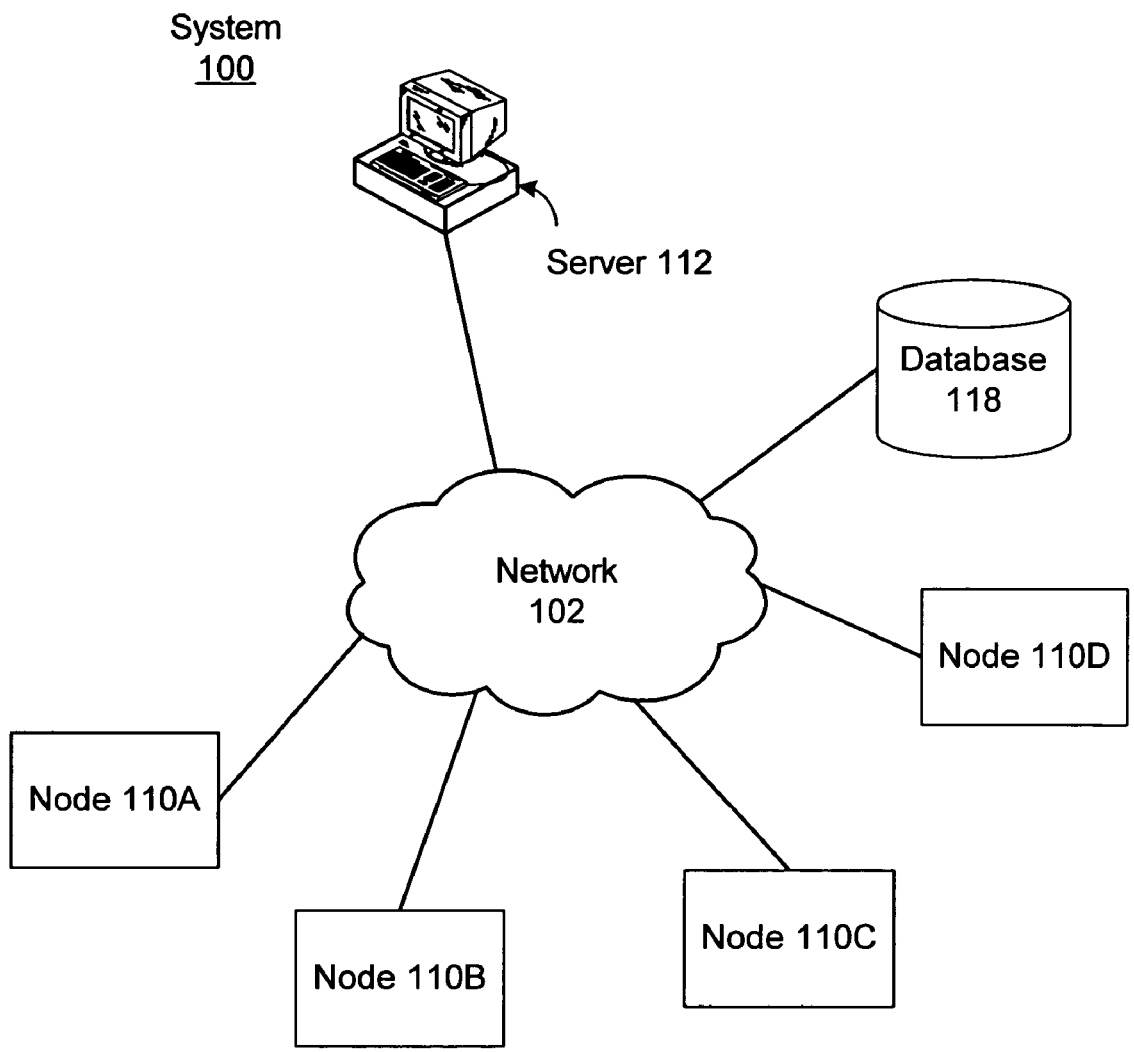

It is noted that FIG. 1A illustrates an exemplary architecture of the system 100 according to one embodiment, and any of various other system architectures may be utilized in other embodiments. For example, FIG. 1B illustrates an alternative embodiment in which the functions of the three server computer systems 112A-112C are performed by a single server computer system 112. In other embodiments, the functions described above may be distributed across servers or other devices in the system 100 in any of various other ways. As one example, the task of monitoring network traffic of the nodes 110 may be distributed across multiple servers or may be distributed across the nodes 110 themselves.

Figure 2:
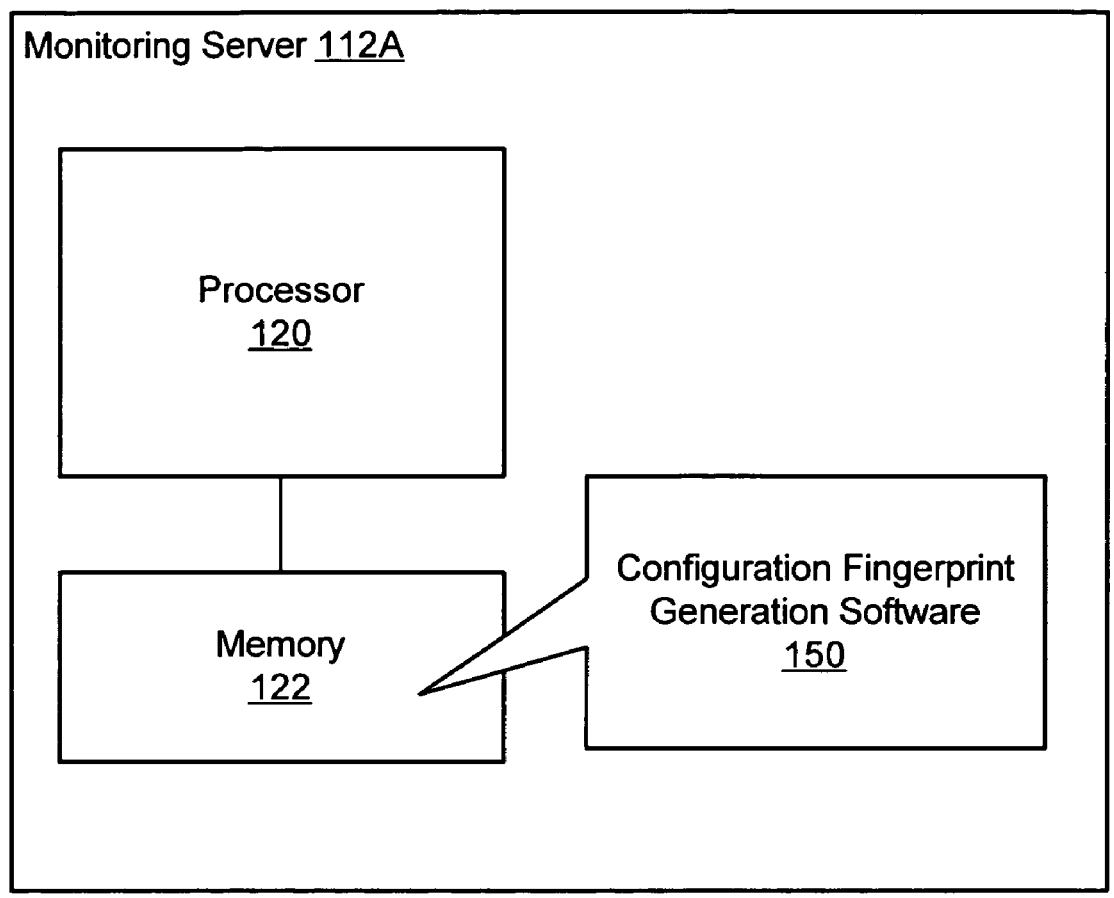
FIG. 2 illustrates an exemplary embodiment of a computer system operable to create configuration fingerprints for nodes in the system.

FIG. 2 illustrates an exemplary embodiment of the monitoring server 112A illustrated in FIG. 1A. The monitoring server 112A includes a processor 120 coupled to a memory 122. The memory 122 may be configured to store program instructions and/or data. In particular, the memory 122 may store configuration fingerprint generation software 150. In one embodiment, the memory 122 may include one or more forms of random access memory (RAM) such as dynamic RAM (DRAM) or synchronous DRAM (SDRAM). However, in other embodiments, the memory 122 may include any other type of memory instead or in addition.

The processor 120 may be configured to execute program instructions and to operate on data stored within the memory 122. In particular, the processor 120 may execute the configuration fingerprint generation software 150. It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the monitoring server 112A may include multiple processors 120.

The processor 120 may execute the configuration fingerprint generation software 150 in order to perform the operations described above with respect to FIG. 1A. For example, the configuration fingerprint generation software 150 may execute to create configuration fingerprints for various nodes 110 in the system 100, e.g., in response to network admission control performed for the nodes 110. In some embodiments the configuration fingerprint generation software 150 may execute to communicate with the nodes 110 in order to actively determine various aspects of the nodes' configurations. The configuration fingerprint generation software 150 may also, or may alternatively, monitor network traffic in order to passively determine various aspects of the nodes' configurations. In other embodiments, the configuration fingerprint generation software 150 may receive or may determine configuration information for the nodes 110 using any of various other techniques.

Figure 3:
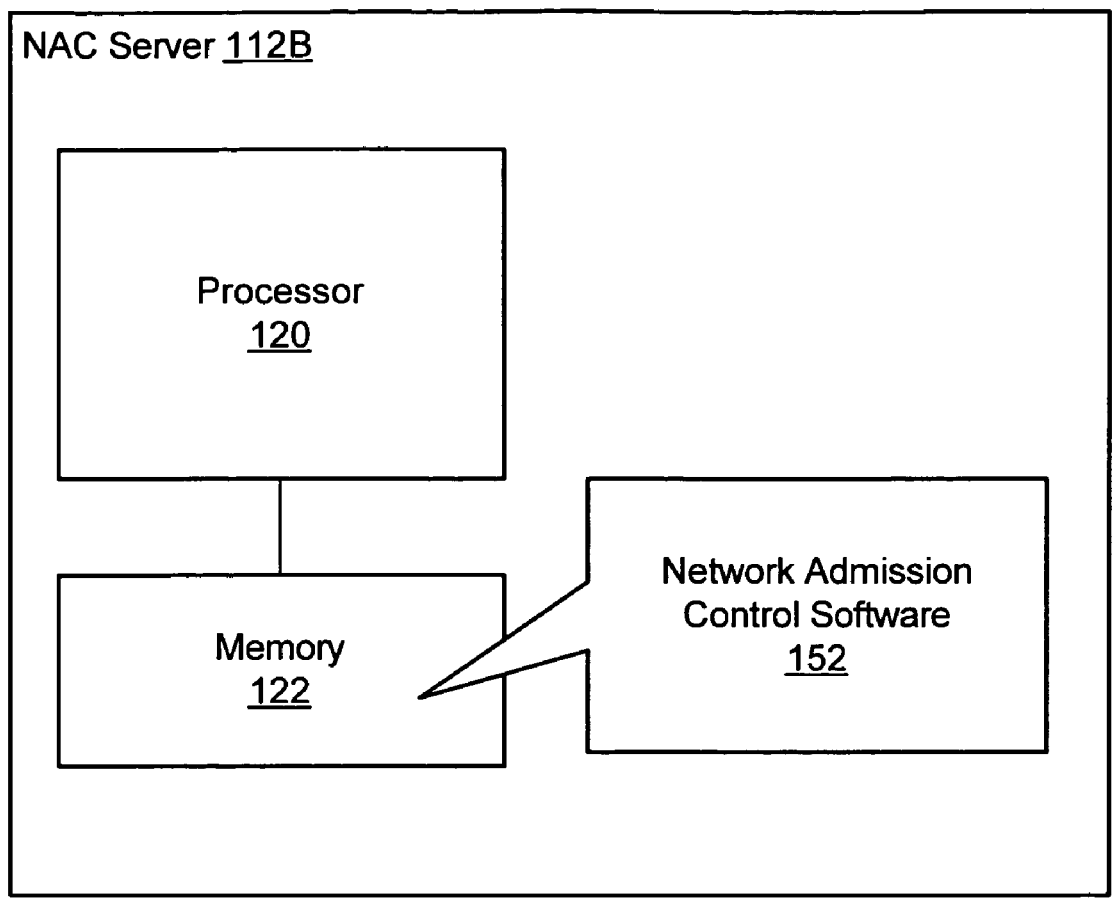
FIG. 3 illustrates an exemplary embodiment of a computer system operable to determine whether to admit nodes to the system, based on their configuration fingerprints.

FIG. 3 illustrates an exemplary embodiment of the network admission control (NAC) server 112B illustrated in FIG. 1A. The NAC server 112B includes a processor 120 coupled to a memory 122. The memory 122 may store network admission control software 152. The processor 120 may execute the network admission control software 152 in order to perform the operations described above with respect to FIG. 1A. For example, the network admission control software 152 may execute to receive configuration fingerprints for nodes 110 when they attempt to join the system 100 and verify that the nodes 110 meet configuration requirements necessary for admission to the system 100, based on the configuration information specified by their respective configuration fingerprints. If a node 110 does not meet the necessary configuration requirements then it may not be admitted to the system 100. In some embodiments the network admission control software 152 may also execute to receive configuration fingerprints for nodes 110 after they have joined the system 100 and verify that the nodes 110 continue to meet configuration requirements necessary for admission to the system 100.

In various embodiments the configuration fingerprints for the nodes 110 may identify any of various aspects regarding configuration of the nodes 110. Exemplary types of information which may be specified by the configuration fingerprints are discussed below. Also, the network admission control software 152 may utilize any desired criteria in determining whether a node 110 should be admitted or allowed to remain in the system 100, e.g., depending on the particular security policies of the system 100. For example, different kinds of systems or environments may set different network admission criteria. In some embodiments the NAC server 112B may store policy information which is used in determining whether a node's configuration is satisfactory for admission to the network. Thus, network admission may be based on both configuration fingerprints and policy information.

Figure 4:
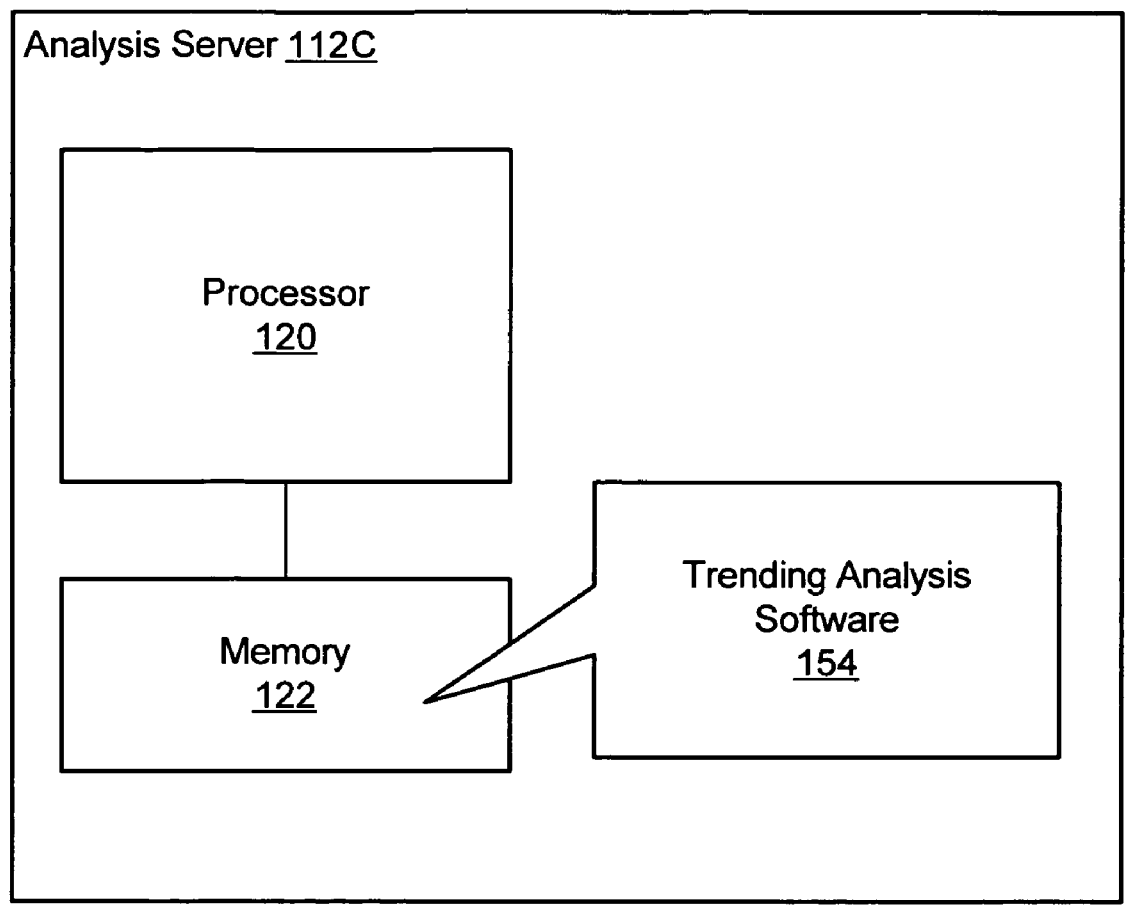
FIG. 4 illustrates an exemplary embodiment of a computer system operable to analyze the configuration fingerprints to detect trends among the nodes in the system.

FIG. 4 illustrates an exemplary embodiment of the analysis server 112C illustrated in FIG. 1A. The analysis server 112C includes a processor 120 coupled to a memory 122. The memory 122 may store trending analysis software 154. The processor 120 may execute the trending analysis software 154 in order to perform the operations described above with respect to FIG. 1A. For example, the trending analysis software 154 may execute to receive configuration fingerprints for the nodes 110 and analyze or inspect the configuration fingerprints in order to determine whether various types of trends exist, as described in more detail below.

It is noted that FIGS. 2-4 are intended to be exemplary only. In alternative embodiments the servers 112 may include any of various other hardware or software components. Also, as noted above, various functions of the servers 112 may be combined, or may be distributed across multiple server computers. As one example, a single server computer may execute both configuration fingerprint generation software 150 and trending analysis software 154. As another example, the configuration fingerprint generation software 150 may be distributed across and executed by multiple server computers.

Figure 5:
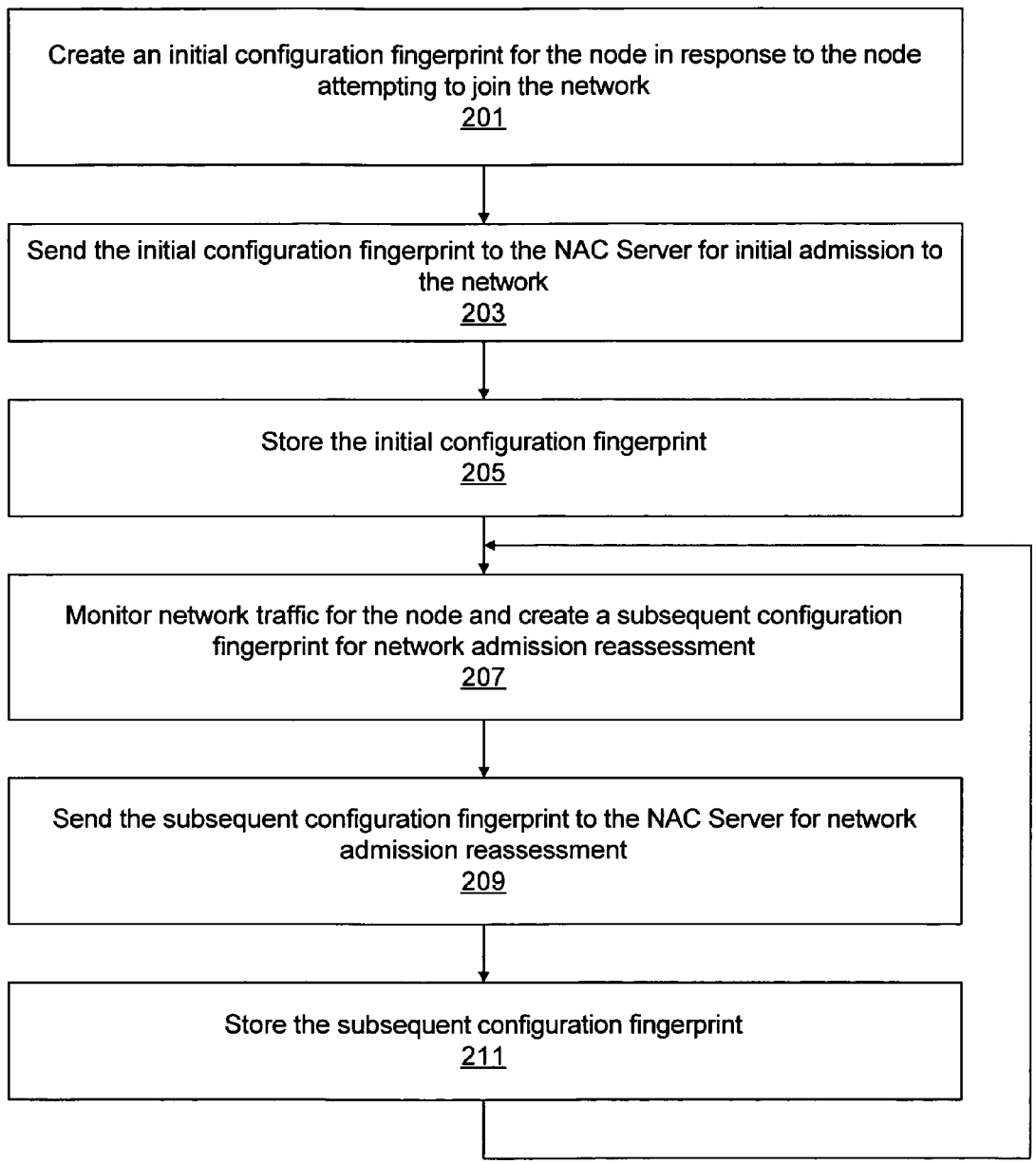
FIG. 5 is a flowchart diagram illustrating one embodiment of a method for creating and storing one or more configuration fingerprints for a given node.

FIG. 5 is a flowchart diagram illustrating one embodiment of a method for creating and storing one or more configuration fingerprints for a given node 110. The configuration fingerprints are created in response to network admission control performed for the node 110. The method of FIG. 5 may be performed with respect to each node 110 in order to create and store configuration fingerprints for each of the nodes 110.

In 201, an initial configuration fingerprint for the node 110 may be created in response to the node 110 attempting to join the network (i.e., in response to the node 110 attempting to join the system 100). For example, in one embodiment the monitoring server 112A may be operable to detect when or may be notified when the node 110 attempts to join the network. The monitoring server 112A may participate in network admission control for the node 110 by creating an initial configuration fingerprint for the node 110, i.e., a configuration fingerprint reflecting the current configuration of the node 110 at the time it attempts to join the network. For example, the monitoring server 112A may communicate with the node 110 to discover any of various aspects of the node's configuration, e.g., such as described below.

In 203, the initial configuration fingerprint for the node 110 may be sent to the NAC Server 112B for initial network admission. For example, after creating the initial configuration fingerprint, the monitoring server 112A may send the initial configuration fingerprint to the NAC server 112B. In other embodiments, the NAC Server 112B may receive the initial configuration fingerprint in any of various other ways. As described above, the NAC server 112B may utilize any desired criteria to determine whether the configuration of the node 110, as specified by the initial configuration fingerprint, is satisfactory for admission to the network. If so, then the node 110 is admitted to the network.

In 205, the initial configuration fingerprint is stored. For example, the initial configuration fingerprint may be stored in a database 118. As described above, the database 118 may be located on any of various computers in the system 100 and may comprise information stored in any format, as desired. As described in more detail below, the initial configuration fingerprint may be analyzed along with other configuration fingerprints in order to detect various types of trends.

As discussed above, in some embodiments, the configuration of the node 110 may continue to be monitored over time after the node 110 has joined the network, e.g., in order to verify that the node 110 continues to satisfy configuration requirements for admission to the network. Thus, one or more subsequent configuration fingerprints for the node 110 may be created after the node 110 has joined the network.

For example, as indicated in 207, in one embodiment, network traffic for the node 110 may be passively monitored, e.g., by the monitoring server 112A (or another computer in the system 100). For example, the monitoring server 112A may intercept network messages generated by the node 110 and inspect the network messages in order to determine various aspects of the configuration of the node 110. For example, the network messages may include information specifying a browser application in use on the node 110, an operating system version being executed by the node 110, a patch level of the operating system, or various other information regarding software or hardware of the node 110. Thus, in some embodiments the monitoring server 112A may determine various aspects of the node's configuration from the network traffic it generates.

In other embodiments, the monitoring server 112A may determine aspects of the node's configuration by actively communicating with the node 110. As one example, the monitoring server 112A may query network software executing on the node 110 to determine which TCP/IP network ports are active on the node 110 or may communicate with other software executing on the node 110 to determine any of various other kinds of information regarding the node's configuration. In an embodiment in which the monitoring server 112A actively communicates with the node 110, the communication is preferably performed in a relatively non-intrusive manner so as to avoid interfering with the node's operation. In particular, the communication may be performed in a manner that does not require a dedicated agent to execute on the node 110. In other words, the monitoring server 112A may determine information regarding the node's configuration by communicating with standard software, e.g., operating system or networking software, rather than communicating with a special application that executes on the node 110 to detect its configuration. However, in other embodiments dedicated monitoring agents may be deployed on the node 110 if desired.

The monitoring server 112A may participate in network admission control for the node 110 by creating a subsequent configuration fingerprint for the node 110 after the node 110 has joined the network, i.e., where the subsequent configuration fingerprint indicates the configuration information determined from monitoring the node's network traffic or actively communicating with the node 110 after it has joined the network, as described above.

As indicated in 209, the subsequent configuration fingerprint may be sent to the NAC Server 112B for network admission reassessment. The NAC server 112B may inspect the subsequent configuration fingerprint to determine whether the configuration of the node 110 still satisfies requirements for admission to the network. If the NAC server 112B determines that the node 110 no longer satisfies the admission requirements then the NAC server 112B may cause the node 110 to be dropped from the system 100. In other embodiments the NAC server 112B may inspect the subsequent configuration fingerprint for other purposes and/or may take other actions. For example, in one embodiment the NAC server 112B may discover that the node's configuration is no longer optimal or is improper but may determine that the problem is not severe enough to terminate its admission status. Thus, the NAC server 112B may take other actions, such as sending an email message to alert an administrator or user of the node 110.

In 211, the subsequent configuration fingerprint may be stored, e.g., in the database 118. As described in more detail below, the subsequent configuration fingerprint may be analyzed along with other configuration fingerprints in order to detect various types of trends in the system 100.

As indicated by the flowchart arrow returning to 207, multiple subsequent configuration fingerprints may be created over time, where each configuration fingerprint may be used to reassess the admission status of the node 110 and may also be stored for use in trending analysis as described below.

In various embodiments, the initial and subsequent configuration fingerprints for the node 110 may comprise any kind of information regarding the configuration of the node. For example, the configuration fingerprints may identify various aspects of software configuration of the node, e.g., may specify information regarding the node's operating system, the applications installed on the node, or data stored on the node. Examples include operating system type, operating system patch level, types of applications installed on the node (e.g., web browsers, instant messenger software, games, virus protection software, etc.), version numbers of applications installed on the node, etc. As another example, the configuration fingerprints may identify various aspects of hardware configuration of the node, such as the processor type, amount of free disk space, amount of available RAM, etc. As another example, the configuration fingerprints may identify any of various other aspects of the node's configuration, such as activity history or user authentication credentials.

It is noted that numerous alternative embodiments and refinements of the above-described method are contemplated. For example, in some embodiments a subsequent configuration fingerprint may only be sent to the NAC server 112B and/or may only be stored in the database 118 it is different from the most recent configuration fingerprint that was created for the node 110.

Thus, the method of FIG. 5 may be applied to each node 110 in the system 100 in order to create a plurality of configuration fingerprints for the node 110 over time. It is noted that in some embodiments, subsequent configuration fingerprints for a node 110 may not be created after the initial configuration fingerprint has been created. For example, in some systems, the configurations of the nodes 110 may be checked upon initially joining the network but not afterward. However, a plurality of configuration fingerprints for a given node 110 may still be stored over time by creating and storing a new configuration fingerprint for the node 110 each time it joins the network.

Figure 6:
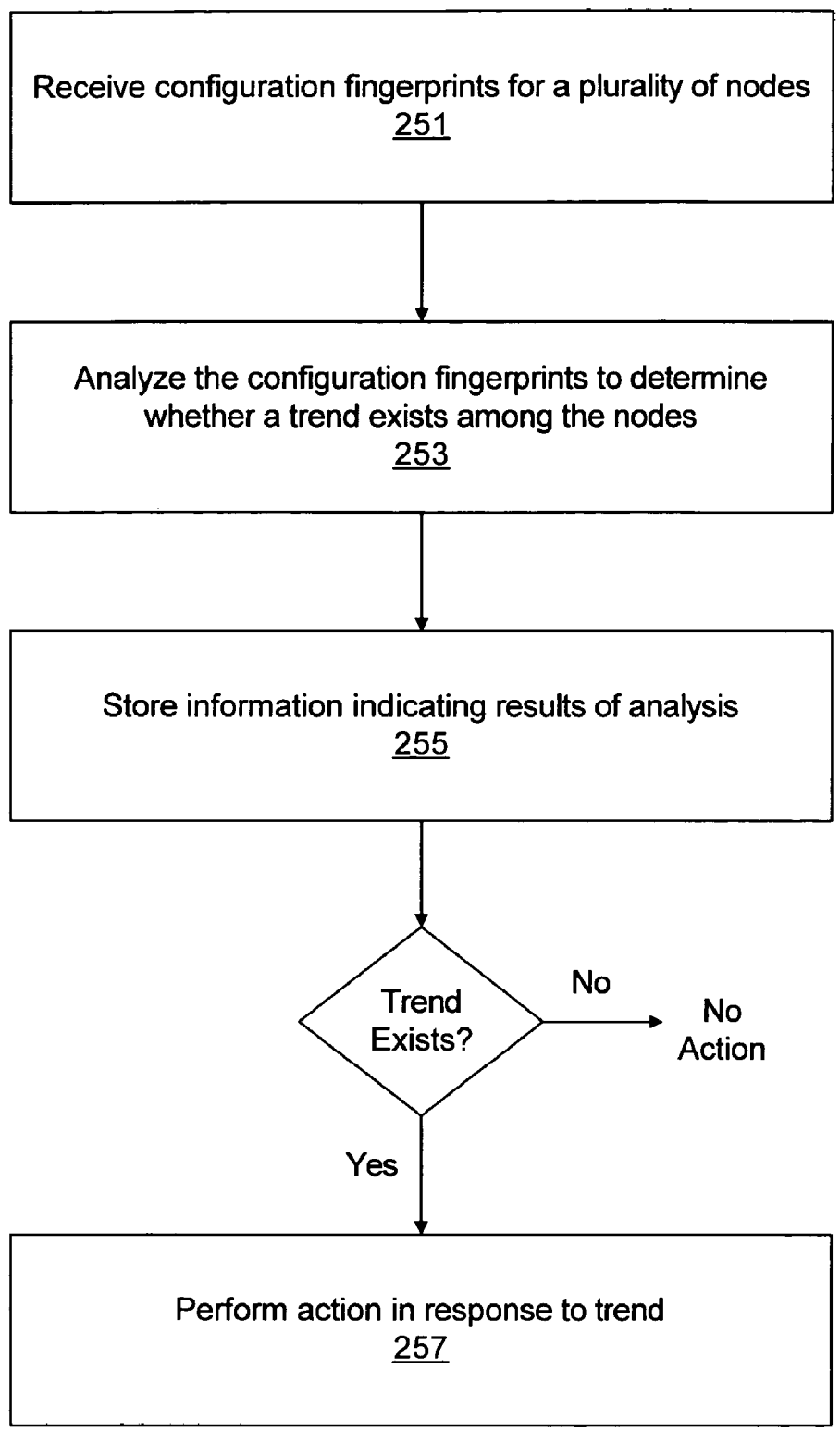
FIG. 6 is a flowchart diagram illustrating one embodiment of a method for detecting a trend among a plurality of nodes in the system based on their configuration fingerprints.

FIG. 6 is a flowchart diagram illustrating one embodiment of a method for detecting a trend among a plurality of the nodes 110 in the system 100 based on the configuration fingerprints created as described above with reference to FIG. 5. The method of FIG. 6 may be performed by a server computer 112 in the system 100, e.g., the analysis server 112A described above with reference to FIG. 1A.

In 251, configuration fingerprints for a plurality of nodes 110 may be received. For example, in an embodiment in which the configuration fingerprints are stored in a database 118, the configuration fingerprints may be received from the database 118. In one embodiment, the plurality of nodes 110 may include all of the nodes 110 in the system 100. In another embodiment, the plurality of nodes 110 may include a subset, but not all, of the nodes 110 in the system 100. Also, in one embodiment, a plurality of configuration fingerprints may be received for each of the nodes 110 in the plurality of nodes. In another embodiment, only a single configuration fingerprint may be received for one or more of the nodes 110.

The configuration fingerprints received in 251 may include initial configuration fingerprints created in response to a network admission control process performed when the nodes 110 initially join the system 100 and/or may include subsequent configuration fingerprints created in response to a network admission control process performed to reassess the nodes' admission statuses after they have already joined the system 100.

In 253, the configuration fingerprints may be analyzed in order to determine whether a trend exists among the nodes 110. As used herein, the term "trend" is used according to its common English meaning, e.g., "a general direction in which something is developing or changing". As discussed above, the configuration fingerprint for the respective nodes may specify any of various kinds of information regarding the nodes' configurations. In various embodiments, the configuration fingerprints may be analyzed in order to identify a trend of any kind based on the configuration fingerprint information.

As noted above, in one embodiment, a plurality of configuration fingerprints may be received in 251 for each node in at least a subset of the nodes in the system 100. For a given node, the plurality of configuration fingerprints for the node may indicate progressive changes in the node's configuration over time. Thus, the configuration fingerprints may be analyzed to determine configuration changes that have occurred on the nodes over time. The progressive configuration changes may indicate the presence of a trend among the nodes.

In some embodiments the configuration fingerprints may be analyzed in order to detect various kinds of trends indicating security threats to the network. For example, suppose that malicious software infects a plurality of the nodes and alters the configurations of the infected nodes. The analysis performed in 253 may be operable to detect that the node configurations have been altered and may determine that the altered configurations indicate a trend of possible infection by malware.

As one example, suppose that the malware replaces a particular software application on the infected nodes with a different version of the software application. The configuration fingerprints for the nodes may identify which version of the software application is currently installed on the nodes. The method may operate to compare the most recent configuration fingerprints for the nodes 110 to previous configuration fingerprints for the nodes 110. For the infected nodes, the method may discover that the software application has been replaced with a different version and may determine that the altered version numbers across the infected nodes indicate a trend of possible infection by malware.

In other embodiments the configuration fingerprints may be analyzed in order to detect various kinds of trends other than trends related to security threats. For example, the method may operate to identify trends related to administration of the network. For example, suppose that users in an enterprise were instructed by a system administrator to install a new version of a software application. Configuration fingerprints of the nodes 110 may be analyzed in order to identify whether there is a trend among the nodes indicating that the software application is being upgraded to the new version or to identify what percentage of users have upgraded to the new version. As another example, configuration fingerprints of the nodes 110 may be analyzed in order to identify whether there is a trend toward a certain type of software application is being installed on a significant percentage of nodes in the system. For example, administrators may desire to ascertain whether a significant percentage of users in an enterprise are installing software that violates business policies, such as game software, file sharing software, instant messenger software, etc.

In other embodiments, any of various other kinds of information indicated by the configuration fingerprints may be utilized in the trend analysis. For example, trends may be identified based on information such as local configuration parameters, active user accounts, software versions, operating system versions, etc. As other examples, trends may be identified based on other configuration information such as activity history or user authentication credentials.

In various embodiments, any types of analyses may be performed based on the configuration fingerprints. For example, any types of statistical methods, comparison methods, or other algorithms or heuristics may be utilized in determining whether a trend is present among the nodes.

The analysis in 253 is preferable performed with little or no human guidance. In some embodiments the analysis may be completely automatic, requiring no human guidance. Also, the analysis preferably requires a relatively small amount of processing power. However, in some embodiments, complicated analysis techniques requiring significant processing power may be utilized, if desired.

Referring again to FIG. 6, in some embodiments, information indicating results of the analysis performed in 253 may be stored, as indicated in 255. For example, in one embodiment the result information may be stored in a database or log file so that it can be reviewed by a human administrator of the system 100.

Also, in some embodiments, the analysis server 112C may be operable to automatically perform an action in response to the trend if a trend is detected, as indicated in 257. In various embodiments the analysis server 112C may perform any of various actions in response to the trend, e.g., depending on the nature of the trend. For example, if a trend indicating a serious security threat is detected, such as a worm, the analysis server 112C may cause the affected nodes 110 to be dropped from the system 100 or may cause the system 100 to halt operation altogether, e.g., to keep the worm from spreading through the system 100. As another example, if the analysis server 112C detects a trend indicating that a large proportion of nodes 110 have not yet been updated with a new version of a software application then the analysis server 112C may simply send an email to administrator to alert the administrator of the problem.

Figure 7:
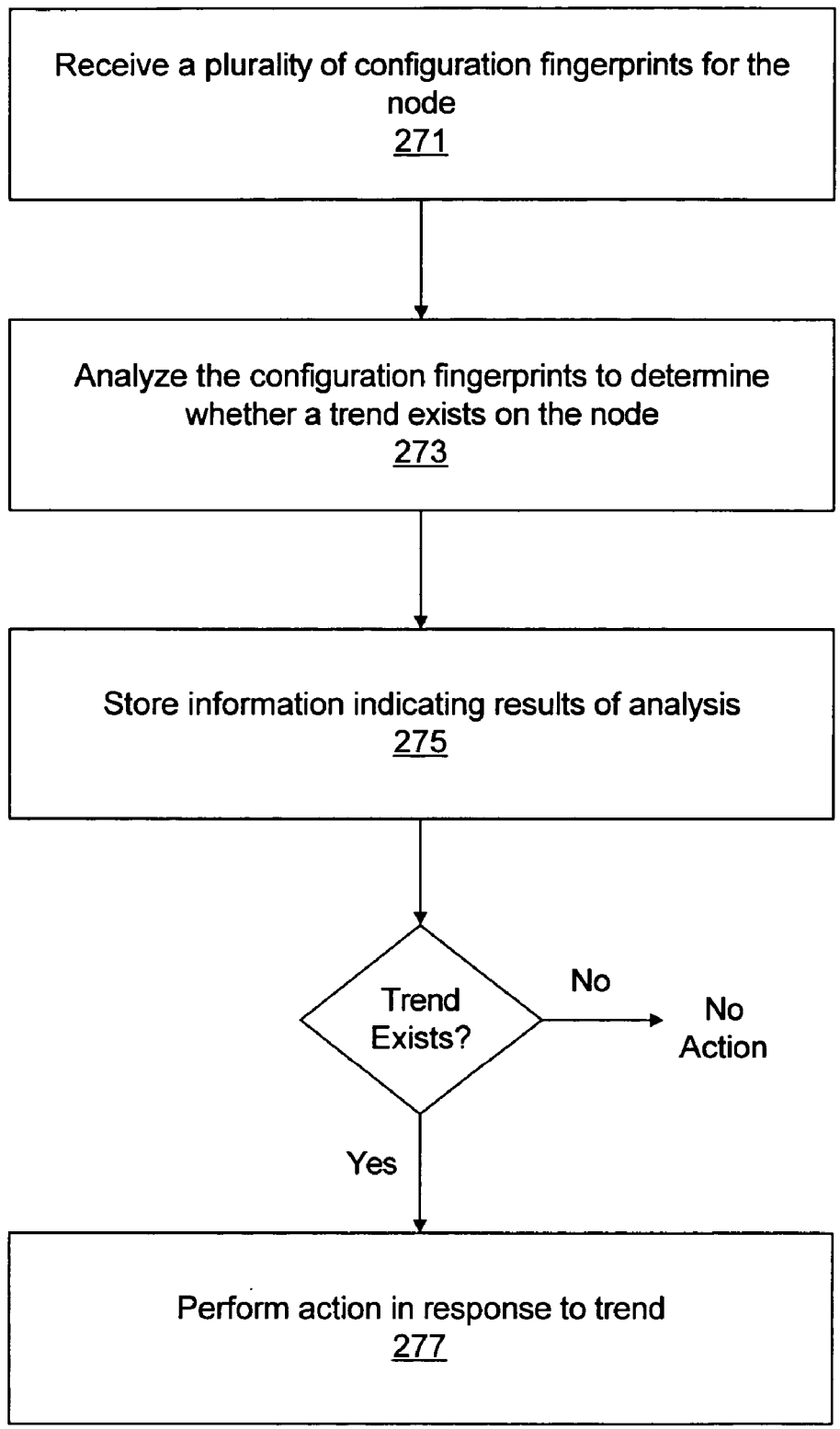
FIG. 7 is a flowchart diagram illustrating one embodiment of a method for detecting a trend on a single node in the system based on its configuration fingerprints.

FIG. 7 is a flowchart diagram illustrating one embodiment of a method for detecting a trend on a single node 110 in the system 100 based on the configuration fingerprints created as described above with reference to FIG. 5. The method of FIG. 7 may be performed by a server computer 112 in the system 100, e.g., the analysis server 112A described above with reference to FIG. 1A.

In 271, a plurality of configuration fingerprints for the node 110 may be received, e.g., from the database 118. As described above with reference to FIG. 5, the configuration fingerprints are created at different points in time and represent selected aspects of the node's configuration at the respective times. The configuration fingerprints may include initial configuration fingerprints created in response to a network admission control process performed when the node 110 initially joins the system 100 and/or may include subsequent configuration fingerprints created in response to a network admission control process performed to reassess the node's admission status after it has already joined the system 100.

In 273, the configuration fingerprints may be analyzed in order to determine whether a trend exists on the node 110. Similarly as described above, in various embodiments, the configuration fingerprints may be analyzed in order to identify a trend of any kind based on the configuration fingerprint information, such as a trend indicating a security threat or a trend related to administration of the node.

The configuration fingerprints for the node may indicate progressive changes in the node's configuration over time. Thus, the configuration fingerprints may be analyzed to determine configuration changes that have occurred on the node over time. The progressive configuration changes may indicate the presence of a trend on the node.

As one example, the configuration fingerprints for the node may specify the current percentage of free space on a hard disk of the node. The method may operate to analyze how the percentage of free space has changed over time and may determine whether the hard disk is trending toward being out of space.

As indicated in 275, in some embodiments, information indicating results of the analysis performed in 273 may be stored, similarly as described above with reference to 255 of FIG. 6.

As indicated in 277, in some embodiments, an action may be automatically performed in response to the trend if a trend is detected. As described above with reference to 257 of FIG. 6, the nature of the action performed may depend on the type of trend detected.

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on any transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for use in a computer network comprising a plurality of nodes, the method comprising:
   performing network admission control for each node, wherein said performing the network admission control for each node comprises creating one or more configuration fingerprints for the node;
   storing the configuration fingerprints for the nodes; and
   detecting a trend based on at least a subset of the configuration fingerprints for the nodes.

2. The method of claim 1,
   wherein the one or more configuration fingerprints for each node identify selected aspects of a configuration of the node.

3. The method of claim 1, further comprising:
   analyzing the at least a subset of the configuration fingerprints;
   where said detecting the trend comprises detecting the trend in response to said analyzing.

4. The method of claim 1,
   wherein the at least a subset of the configuration fingerprints comprises configuration fingerprints for a plurality of the nodes in the network;
   wherein said detecting the trend comprises detecting a trend across the plurality of nodes based on the configuration fingerprints for the plurality of the nodes.

5. The method of claim 1,
   wherein the at least a subset of the configuration fingerprints comprises a plurality of configuration fingerprints for a first node in the network;
   wherein said detecting the trend comprises detecting a trend on the first node based on the plurality of configuration fingerprints for the first node.

6. The method of claim 1,
   wherein the network includes a first node;
   wherein performing the network admission control for the first node comprises:
      creating a first configuration fingerprint for the first node in response to the node attempting to join the network; and
      verifying that a configuration of the first node satisfies requirements for initial admission to the network, based on the first configuration fingerprint for the first node.

7. The method of claim 6, wherein said performing the network admission control for the first node further comprises:
   creating a second configuration fingerprint for the first node after the first node has joined the network; and
   verifying that the configuration of the first node satisfies requirements for continued admission to the network, based on the second configuration fingerprint for the first node.

8. The method of claim 1,
   wherein the trend indicates a security threat for the computer network.

9. A computer-readable memory medium for performing trending analysis in a computer network comprising a plurality of nodes, the memory medium comprising program instructions executable to:
   receive a plurality of configuration fingerprints, wherein each configuration fingerprint specifies configuration information for one of the nodes and is created in response to a network admission control process for the node; and
   analyze the plurality of configuration fingerprints to determine whether a trend exists among the nodes.

10. The computer-readable memory medium of claim 9,
    wherein the plurality of configuration fingerprints comprise multiple configuration fingerprints for each node in at least a subset of the nodes;
    wherein said analyzing the plurality of configuration fingerprints to determine whether the trend exists among the nodes comprises analyzing the multiple configuration fingerprints for each node in the at least a subset of the nodes to determine whether a trend exists among the at least a subset of the nodes.

11. The computer-readable memory medium of claim 9,
    wherein said analyzing the plurality of configuration fingerprints to determine whether the trend exists among the nodes comprises analyzing the plurality of configuration fingerprints to determine whether a trend indicating a security threat exists among the nodes.

12. A computer server for use in a computer network comprising a plurality of nodes, the computer server comprising:
    a processor; and
    a memory storing program instructions;
    wherein the processor is operable to execute the program instruction to:
       receive a plurality of configuration fingerprints, wherein each configuration fingerprint specifies configuration information for one of the nodes and is created in response to a network admission control process for the node; and analyze the plurality of configuration fingerprints to determine whether a trend exists among the nodes.

13. The computer server of claim 12, wherein the plurality of configuration fingerprints comprise multiple configuration fingerprints for each node in at least a subset of the nodes;

wherein said analyzing the plurality of configuration fingerprints to determine whether the trend exists among the nodes comprises analyzing the multiple configuration fingerprints for each node in the at least a subset of the nodes to determine whether a trend exists among the at least a subset of the nodes.

14. The computer server of claim 12, wherein said analyzing the plurality of configuration fingerprints to determine whether the trend exists among the nodes comprises analyzing the plurality of configuration fingerprints to determine whether a trend indicating a security threat exists among the nodes.

* * * * *